United States Patent
Moss et al.

[11] Patent Number: 5,949,174
[45] Date of Patent: Sep. 7, 1999

[54] COMMUTATOR FOR TWO SPEED ELECTRIC MOTOR AND MOTOR INCORPORATING SAME

[75] Inventors: Graham D. Moss, Dutton; Scott Campbell, London, both of Canada

[73] Assignee: Siemens Canada Limited, Mississauga, Canada

[21] Appl. No.: 09/111,675

[22] Filed: Jul. 8, 1998

[51] Int. Cl.⁶ .................................................. H01R 43/06
[52] U.S. Cl. ..................... 310/233; 310/231; 310/235; 310/248; 310/237; 310/128; 310/173; 310/224; 310/135; 310/143; 310/238
[58] Field of Search .................................. 310/233, 231, 310/235, 248, 237, 128, 173, 224, 135, 143, 238, 234

[56] References Cited

U.S. PATENT DOCUMENTS

| | | | |
|---|---|---|---|
| 3,010,182 | 11/1961 | Quinlan | 29/155.54 |
| 3,486,056 | 12/1969 | Vuillemot | 310/228 |
| 3,487,249 | 12/1969 | Nicholls et al. | 310/234 |
| 3,521,101 | 7/1970 | Arora | 310/233 |
| 3,819,964 | 6/1974 | Noodleman | 310/46 |
| 3,892,987 | 7/1975 | Noodleman | 310/46 |
| 4,910,790 | 3/1990 | Kershaw | 388/836 |
| 4,948,998 | 8/1990 | Fink et al. | 310/127 |
| 5,149,999 | 9/1992 | Abo et al. | 310/239 |
| 5,164,623 | 11/1992 | Shkondin | 310/67 R |
| 5,434,463 | 7/1995 | Horski | 310/248 |
| 5,614,775 | 3/1997 | Horski et al. | 310/68 R |
| 5,689,148 | 11/1997 | Rubinchik | 310/239 |
| 5,734,219 | 3/1998 | Horski et al. | 310/240 |
| 5,760,517 | 6/1998 | Stolpmann | 310/233 |
| 5,793,140 | 8/1998 | Tuckey | 310/237 |

*Primary Examiner*—Nestor Ramirez
*Assistant Examiner*—Thanh Lam

[57] ABSTRACT

A commutator is disclosed which is adapted to be mounted on a rotor shaft of an electric motor for cooperation with electrical contacts of the motor, the commutator being capable of accommodating two speeds of the motor. The commutator includes a support member formed of electrically insulating material and having a central opening for receiving the rotor shaft, the support member having a surface portion for attachment of commutator segments. A first plurality of circumferentially spaced, electrically conductive commutator segments are attached to the surface portion of the support member and are arranged in a generally circular array and wired to the armature to accommodate at least a first speed of the motor. A second plurality of circumferentially spaced, electrically conductive commutator segments are attached to the surface portion of the support member and are positioned radially outward of the first plurality of spaced commutator segments. The second plurality of segments are also arranged in a generally circular array and wired to the armature to accommodate the second speed of the motor. Hook members are provided to connect the first and second pluralities of commutator segments to the armature windings of the motor. The hook members preferably extend through apertures in the support member. A two speed motor incorporating the commutator is also disclosed. The commutator may also be arranged to be incorporated into motors having more than two speeds.

25 Claims, 2 Drawing Sheets

COMMUTATOR FOR TWO SPEED ELECTRIC MOTOR AND MOTOR INCORPORATING SAME

BACKGROUND OF THE INVENTION

1. FIELD OF THE INVENTION

The present invention is directed to commutators for use in two speed motors. In particular, a single commutator is provided on the rotor shaft to accommodate a multiple speed motor, particularly a two speed motor, utilizing minimal axial motor space.

2. DESCRIPTION OF RELATED ART

Dual winding type two speed electric motors are well known and require two commutators within the motor to direct electrical energy to the armature windings of the motor. One commutator is structured and wired to accommodate a first speed arrangement for the motor and the second commutator is structured and wired to accommodate the second speed of the motor.

Such systems encounter increased costs to develop, tool, inventory and process multiple commutators. In addition, the brush card complexity is increased because the brushes must operate on different planes within the motor. Furthermore, the axial space required to support multiple commutators generally increases the size of the motor.

Commonly assigned U.S. Pat. No. 4,910,790 relates to a two speed motor which utilizes a first radially extending commutator to accommodate one speed of the motor and a second cylindrical commutator to accommodate a second speed of the motor. The cylindrical commutator is mounted on the shaft of the motor and utilizes shaft space to accommodate the second speed commutator. The disclosure of U.S. Pat. No. 4,910,790 is incorporated herein by reference.

Commonly assigned U.S. Pat. No. 5,434,463 relates to a representative direct current motor which utilizes a commutator in combination with crescent shaped brushes. The disclosure of. U.S. Pat. No. 5,434,463 is incorporated herein by reference.

U.S. Pat. No, 5,095,611 relates to a method of assembling an electric motor to eliminate a separate end play adjustment wherein permanent magnets act on the armature laminations to urge the motor shaft in one direction so that the entire end play appears at only one end of the shaft. The disclosure of U.S. Pat. No. 5,095,611 is incorporated herein by reference.

Commonly assigned, concurrently filed U.S. patent application entitled Combined Armature and Structurally Supportive Commutator for Electric Motors, the disclosure of which is incorporated herein by reference, is directed to a novel combined armature and structurally supportive commutator wherein the rotational torque is transmitted to the armature by the commutator. Commonly assigned, concurrently filed U.S. patent application entitled Commutators for Electric Motors and Method of Manufacturing Same, the disclosure which is incorporated herein by reference, is directed to a novel method for manufacturing commutators for electric motors which eliminates costly manufacturing steps and loss of material.

U.S. Pat. No. 4,481,439 relates to a molded commutator made up of segments arranged in a ring with their brush contact surfaces facing inwardly and forming a cylindrical shape. A matrix of plastic is molded between and around the outside of the segment ring in order to separate the segments electrically and to hold them in the ring configuration.

U.S. Pat. No. 4,663,834 relates to a method for making an inverted commutator assembly for mounting on a rotor shaft, comprising forming a plurality of rotatable commutator segments with each segment having a brush contact surface into a ring in which the segments are circumferencially arranged in a spaced-apart relationship about a longitudinal axis of rotation, and placing reinforcing means in the form of an outer casing of high tensile strength material around the longitudinal axis of rotation for reinforcing the segments, molding a matrix of insulating material between the inside of the casing and the outside of the ring of segments and between the segments for electrically isolating the segments, and attaching to the matrix, means for affixing the commutator assembly to a rotatable shaft passing through the longitudinal axis of rotation.

U.S. Pat. No. 4,349,759 relates to a commutator for electrical machines and a method of manufacture of the commutator in which the commutator consists of a lamination assembly held together by a pair of shrink-rings. One of the rings serves to support the commutator on a commutator hub and comprises first and second ring portions having between them a decoupling portion. The first ring portion is in the form of a shrink-ring and holds together the lamination assembly. The second ring portion is secured to the commutator hub. The other shrink-ring also holds together the lamination assembly. In the method of manufacture of the commutator, both the first and second ring portions are simultaneously shrunk on to the lamination assembly and commutator hub respectively.

In engine compartments of modern day automobiles the need to minimize the space taken by the motor and related support equipment has become increasingly critical to the performance of the automobile. In particular, the need to reduce the axial length of the cooling motors has become increasingly significant. The present invention is directed to a unitary commutator which is capable of accommodating a two speed motor and which is structured and arrayed to minimize the space taken by the commutator within the motor along the axial length.

BRIEF SUMMARY OF THE INVENTION

The invention relates to a commutator adapted to be mounted on a rotor shaft of an electric motor for cooperation with electrically conductive brushes to direct electric current from a power source to armature windings of the motor, which comprises support member formed of electrically insulating material and having a surface portion for attachment of commutator segments, and a first plurality of circumferentially spaced, electrically conductive commutator segments attached to the surface portion of the support member and arranged in a generally circular array. The first plurality of segments are electrically connected to the armature windings in a manner to accommodate a first lower speed of the motor. At least a second plurality of circumferentially spaced, electrically conductive commutator segments are attached to the surface portion of the support member and positioned radially outward of the first plurality of spaced commutator segments and concentric therewith. The second outer array of segments are arranged in a generally circular array. The second plurality of segments are electrically connected to the armature windings in a manner to accommodate a second higher speed of the motor. Each of the pluralities of first and second commutator segments further comprises a hook for electrically connecting the segment to the armature of the motor.

In the preferred embodiment disclosed, the number of commutator segments in the outer array is twice the number of segments in the inner array. However, any number of relative combinations of segments may be utilized.

Preferably, the support means is formed of a resinous material and the first and second pluralities of circumferentially spaced commutator segments each has a configuration of a sector of an annulus. The first and second pluralities of commutator segments are preferably adhesively attached to the first surface portion of the support means and are comprised of copper sheet material. In the preferred embodiment, the support member is adapted to be mounted on a rotor shaft of the motor.

The invention also relates to a two speed electric motor which comprises, a housing, a rotor positioned within the housing and including a rotor shaft rotatably mounted within the housing, an armature core having armature windings wound therearound, and a commutator for directing electric current from a plurality of electrically conductive brushes to the armature windings. The commutator includes a support member formed of electrically insulating material and is adapted to be mounted on the rotor shaft, the support member having a surface portion for attachment of commutator segments. A first plurality of circumferentially spaced, electrically conductive commutator segments are attached to the surface portion of the support member and are arranged in a generally circular array to accommodate a first speed of the motor. At least a second plurality of circumferentially spaced, electrically conductive commutator segments are attached to the surface portion of the support member and are positioned radially outward of the first plurality of spaced commutator segments, the second plurality of segments being arranged in a generally circular array to accommodate at least a second speed of the motor. A hook is attached to each of the commutator segments to electrically connect the first and second plurality of commutator segments to armature windings of the motor.

BRIEF DESCRIPTION OF THE SEVERAL VIEWS OF THE DRAWINGS

Preferred embodiments of the invention are described hereinbelow with reference to the drawings, wherein.

DETAILED DESCRIPTION OF THE INVENTION

Figure 1:
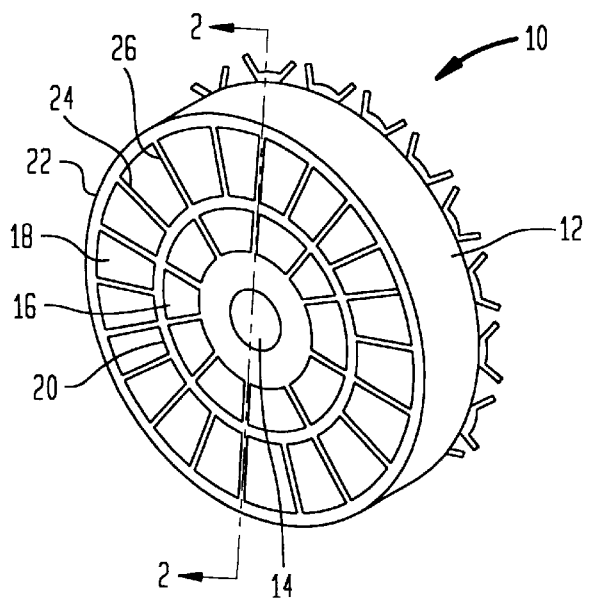
FIG. 1 is a perspective view of a disc-type two speed face commutator constructed according to the present invention.

Referring initially to FIG. 1 there is shown a disc-type face commutator 10 which is constructed according to the present invention to accommodate a motor wired for two speeds. The commutator 10 is generally constructed of a structural support member 12, preferably comprised of molded electrically insulating resinous material, preferably a phenolic resin. Other suitable insulating materials are contemplated. The phenolic resin is molded in the form of a disc-like support member 12 having a central aperture 14. A plurality of electrically conductive copper alloy commutator segments 16 and 18 are attached to the molded support member 12 as will be described.

The first series of commutator segments 16 are each shaped in the form of a sector of annulus and are arranged in a circular array as shown in FIG. 1. The second plurality of electrically conductive commutator segments 18 are each shaped as a sector of an annulus and are arranged in a circular array along a radius which is greater then the first circular array of segments as shown in FIG. 1. In particular, the sector of an annulus shape is defined by a segment of conductive sheet material, preferably copper alloy, which is bounded on the radially inner and outermost sides by concentric circular arcuate edges 20 and 22, and on each of two sides by adjacent radially extending straight edges 24 and 26 as shown in FIG. 1. It is also noted that as shown in FIG. 1, the inner array of commutator segments 16 are one half the number of segments 18 located in the outer array, the inner array of segments 16 being wired to accommodate a lower motor speed and the outer array of segments 18 being wired to accommodate a higher motor speed. In the commutator shown in the Figs. there are twenty (20) commutator segments 18 in the outer array to accommodate a higher motor speed and there are ten (10) commutator segments 16 in the inner array to accommodate a lower motor speed. A brush card (shown in FIG. 2) will have two (2) sets of four (4) brushes spaced 90° (degrees) apart from each other. For 4 pole, lap wound armature motors the radially outermost set of brushes are arranged to contact the outermost segments 18 and the radially innermost set of brushes are arranged to contact the innermost segments 16; alternatively, for 6 pole wave wound armature motors, two (2) sets of two (2) brushes, typically 190° apart from each other are utilized.

Figure 2:
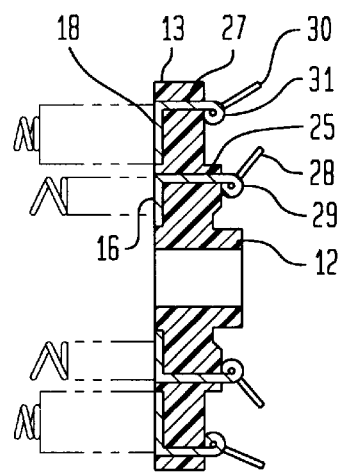
FIG. 2 is a cross-sectional view taken along line 2—2 of FIG. 1.

Referring once again to FIG. 1 in conjunction with FIG. 2, the copper alloy segments 16 and 18 are appropriately attached to the molded support member 12 by any suitable adhesive or by mechanical means. In particular, application of structural high temperature acrylic or epoxy adhesive material is preferred in order to withstand the shear forces provided when the brushes of the motor slidably engage the surface of each commutator segment as the commutator is rotated on the rotor shaft of the motor. Alternatively, any suitable method of attachment of the copper alloy segments 16 and 18 to the molded support member 12 may be utilized. For example, the support member 12 may be molded directly onto and around the copper alloy segments 16 and 18. One preferred method of manufacturing such a commutator is disclosed in the aforementioned commonly assigned, concurrently filed application entitled Commutators for Electric Motors and Method of Manufacturing Same.

Referring now to FIG. 2 in conjunction with FIG. 1 there is shown a plurality of hook members 29 and 31 which extend from the face side of the support member 12, through apertures 25 and 27 in the support member and emerge from the opposite side of the support member 12. This arrangement leaves the outer periphery 13 of support member 12 free of hooks and provides a continuous smooth outer surface for the commutator. The hooks 29 and 31 are utilized to accommodate armature wires 28 and 30, which are electrically connected to the hooks after removal of their insulation, either by crimping, fusing, soldering or by other suitable techniques. The hooks 29 and 31 are provided to conduct electrical energy to the armature windings. Alternatively for certain applications, the hooks of the outer segments can be made to extend over the outer circumferential periphery of support member 12.

As can readily be observed, the commutator constructed according to the present invention as shown in the drawings includes a first inner array of commutator 16 segments and a second outer array of commutator segments 18 in respective concentric relation. As noted, the first inner array of commutator segments 16 are adapted to be engaged by a first set of electrically conductive brushes for conveying electrical energy to the armature windings, and the second outer array of commutator segments 18 are spaced radially outward of the first array of segments and are also intended to be engaged by electrically conductive brushes for conducting electrical energy to the armature windings to accommodate the high speed feature of the two speed motor. It can be readily observed that by positioning both sets of commutator segments on the same face of the commutator support member 12, the axial space taken by the commutator within the motor will be minimized and the need for two separate commutators will be avoided. Accordingly, the need for utilization of space within the motor along the axial direction of the rotor shaft will be achieved with the result that the motor will be of minimal length.

The present invention provides a number of advantages over prior art arrangements. In particular, only one commutator is required for an armature to achieve a dual winding. Furthermore, the flat faced commutator utilizes axial space occupied by the armature core, thus allowing both the high and the low speed brushes to operate inside the stack, thus reducing the axial length of the motor substantially. Moreover, one commutator brush surface allows for easier armature processing, requiring only one pass through an armature lathe. Also, the commutator design interfaces with an extremely compact brush card design which can be packaged inside the stack, holding an appropriate set of high speed and low speed brushes, preferably four (4) or two (2) high and four (4) or two (2) low speed brushes, but leaving enough room for full Radio Frequency Inhibition Protection—"RFI" (i.e. 3 chokes and 3 capacitors). Finally, the present commutator allows a dual wound motor to have an axial length slightly longer than the width of the armature, thus reducing the length up to approximately 40 percent.

Figure 4:
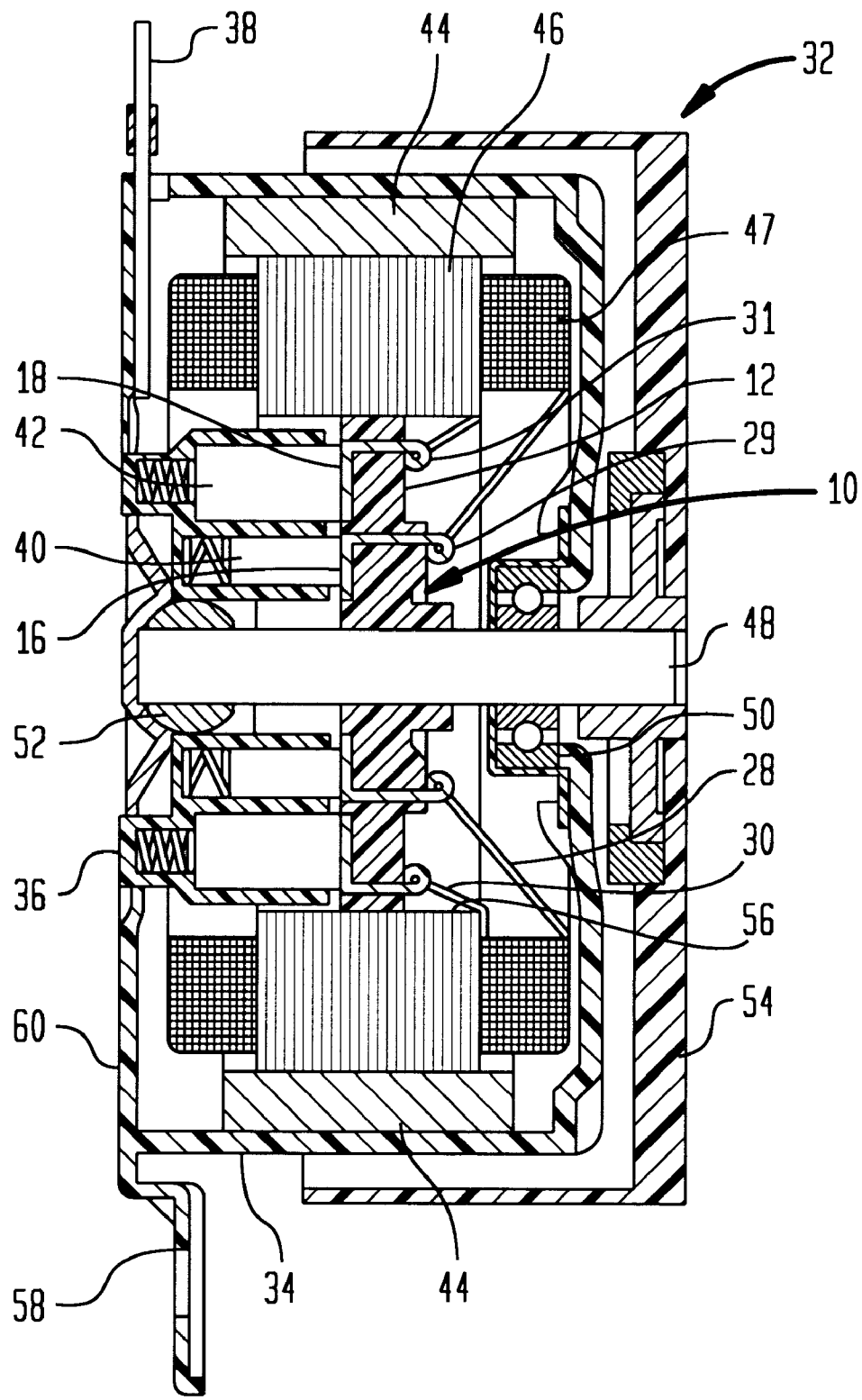
FIG. 4 is a cross-sectional view of a two speed motor incorporating the commutator of FIGS. 1–3.

Referring now to FIG. 4, a cross-section of a motor 32 is shown which incorporates the two speed commutator 10 of FIG. 1. The commutator 10 is formed of a molded phenolic resinous structural disc-like support member 12 and includes a dual plurality of commutator segments 16 and 18 associated respectively with the low speed and high speeds of the motor. Armature core 46 is formed of a stack of ferromagnetic steel laminations and is appropriately wired by windings 47 to create a suitable armature for a two speed motor of the type shown. The two speed wiring arrangement is not shown, but is well known to persons skilled in the art. One example is disclosed in the aforementioned U.S. Pat. No. 4,910,790.

Figure 3:
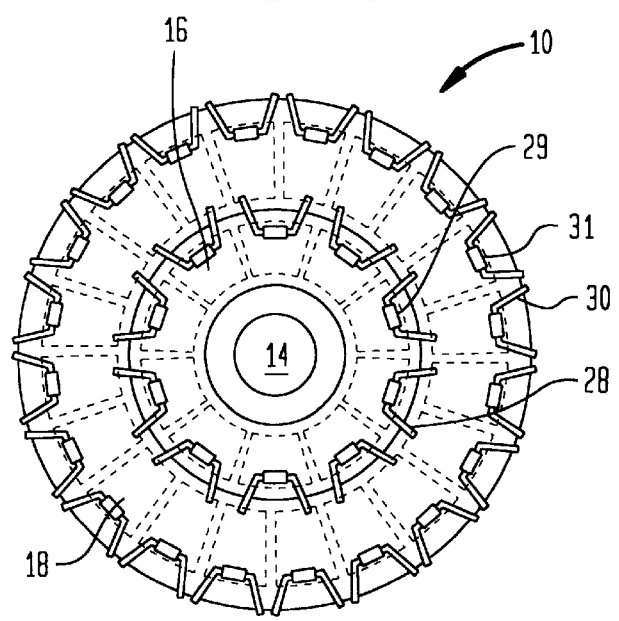
FIG. 3 is a rear elevational view of the commutator shown in FIGS. 1 and 2.

Referring now to FIG. 4 in conjunction with FIGS. 1–3, the motor which is shown includes a plastic housing 34, and brush card 36 which includes bus bars 38 at the upper portion. The plastic housing 34 will include a steel flux ring, or alternatively a steel housing may be provided. The bus bars 38 are appropriately wired to the brushes 40 and 42 of brush card 36. The housing 34 includes within the inner periphery thereof a plurality of permanent magnets 44. The armature core 46 is spokeless as shown, in that radial spokes which supported the armature core in the prior art have been eliminated. The shaft 48 is mounted to housing 34 by front bearing ball bearing unit 50 and at the rear by bearing unit 52. A fan hub 54 is mounted to shaft 48 as shown. Disc-type commutator 10 is mounted on shaft 48 and extends radially outwardly so as to contact and support the armature core 46 and armature windings 47 on shaft 48.

In the motor shown in FIG. 4 the commutator is preferably attached to the armature core 46 by dimensioning the disc-like commutator 10 so as to be pressed into the central opening 56 of the armature core 46 in interference relation with the inner surface of the opening in the manner disclosed for example, in commonly assigned, concurrently filed U.S patent application entitled Combined Armature and Structurally Supportive Commutator for Electric Motors. Thus, the armature core 46 and the commutator 10 are rotatably fixed to each other, whereby rotation of the commutator disc-like support member 12 is effected by rotation of the armature, such that all torque is transmitted from the armature core 46 directly to the commutator disc-like support member 12. The disc-like support member 12 is in turn rotatably attached to the shaft 48 by known means. Bracket 58 is an integral part of rear cover plate 60 and is one of the three equally spaced brackets used to attach the motor to a shroud or other support.

Although the method of the attachment of the armature core 46 and commutator 10 as described above is preferred, other relative arrangements between the armature and the commutator are contemplated without departing from the invention. For example, the commutator may be attached to the armature core by alternative means, or it may be incorporated into a motor utilizing an armature which is supported on the rotor shaft by conventional lamination spokes. In such instance, the commutator of the present invention will still conserve axial space within the motor due to its construction. Further, the armature may be made of a plurality of stacked laminations as shown. Alternatively, the armature laminations may be formed of a resin bonded matrix of ferromagnetically compatible steel particles, or the core may be made of a solid ferromagnetic material such as steel.

Furthermore, the commutator disclosed herein can readily be arranged to accommodate motors having three or more speeds by providing separate and individual concentric arrays of commutator segments on the support member, each array being associated with a predetermined selected speed of the motor.

We claim:

1. A commutator adapted to be mounted on a rotor shaft of an electric motor for cooperation with electrically conductive brushes to direct electric current from a power source to armature windings of the motor, which comprises:
    a) support member formed of electrically insulating material and having a surface portion for attachment of commutator segments;
    b) a first plurality of circumferentially spaced, electrically conductive commutator segments attached to said surface portion of said support member and arranged in a generally circular array, each said first plurality of segments being constructed and arranged to be engaged by a first set of brushes to thereby be electrically connected to the armature windings in a manner to accommodate a first speed of the motor; and
    c) at least a second plurality of circumferentially spaced, electrically conductive commutator segments attached to said surface portion of said support member and positioned radially outward of said first plurality of spaced commutator segments, said second plurality of segments arranged in a generally circular array, each said second plurality of segments being constructed and arranged to be engaged by a second set of brushes to thereby be electrically connected to the armature windings in a manner to accommodate a second speed of the motor.

2. The commutator according to claim 1, wherein each said plurality of commutator segments further comprises hooks.

3. The commutator according to claim 2, wherein each said second plurality of segments further comprises hooks.

4. The commutator according to claim 3, wherein said support member is formed of a resinous material.

5. The commutator according to claim 4, wherein said first plurality of circumferentially spaced commutator segments each has a configuration of a sector of an annulus.

6. The commutator according to claim 5, wherein said second plurality of circumferentially spaced commutator segments each has a configuration of a sector of an annulus.

7. The commutator according to claim 1, wherein said first plurality of commutator segments are adhesively attached to said first surface portion of said support member.

8. The commutator according to claim 7, wherein said second plurality of commutator segments are adhesively attached to said first surface portion of said support member.

9. The commutator according to claim 1, wherein said first plurality of commutator segments are comprised of copper alloy sheet material.

10. The commutator according to claim 9, wherein said second plurality of commutator segments are comprised of copper alloy sheet material.

11. The commutator according to claim 10, wherein there are twice as many commutator segments in said second plurality of segments as in said first plurality of segments.

12. The commutator according to claim 11, wherein said support member is adapted to be mounted on a rotor shaft of the motor.

13. The commutator according to claim 1, wherein each said first and second plurality of commutator segments comprises a hook which extends from one side of said support member through an aperture therein to the opposite side of said support member.

14. A two speed electric motor which comprises:
a) a housing:
b) a rotor positioned within said housing and including:
  1) a rotor shaft rotatably mounted within said housing;
  2) an armature core having armature windings wound therearound; and
c) a commutator for directing electric current from a plurality of conductive brushes to the armature windings, said commutator including:
  1) a support member formed of electrically insulating material and adapted to be mounted on the rotor shaft, said support member having a surface portion for attachment of commutator segments;
  2) a first plurality of circumferentially spaced, electrically conductive commutator segments attached to said surface portion of said support member and arranged in a generally circular array to be engaged by a first set of brushes to accommodate a first speed of the motor;
  3) at least a second plurality of circumferentially spaced, electrically conductive commutator segments attached to said surface portion of said support member and positioned radially outward of said first plurality of spaced commutator segments, said second plurality of commutator segments being arranged in a generally circular array to be engaged by at least a second set of brushes to accommodate at least a second speed of the motor; and
  4) a hook attached to each of said first and second plurality of commutator segments to electrically connect said first and second plurality of commutator segments to armature windings of the motor.

15. The two speed electric motor according to claim 14, wherein there is twice the number of commutator segments in said second plurality of segments as in said first plurality of segments.

16. The two speed electric motor according to claim 15, wherein there are ten commutator segments in said first plurality of segments and there are twenty commutator segments in said second plurality of commutator segments.

17. A two speed electric motor which comprises:
a) a housing;
b) a rotor positioned within said housing and including:
  1) a rotor shaft rotatably mounted within said housing; and
  2) an armature core having armature windings wound therearound, said armature windings being wired for two motor speeds;
c) a face commutator for directing electric current from a plurality of electrically conductive brushes to the armature windings, said commutator including:
  1) support means formed of electrically insulating material and having a central opening for receiving the rotor shaft, said support means having a surface portion for attachment of commutator segments;
  2) a first plurality of circumferentially spaced, electrically conductive commutator segments attached to said surface portion of said support means and arranged in a generally circular array to accommodate at least a first speed of the motor;
  3) a second plurality of circumferentially spaced, electrically conductive commutator segments attached to said surface portion of said support means and positioned radially outward of said first plurality of spaced commutator segments, said second plurality of segments arranged in a generally circular array to accommodate at least a second speed of the motor;
d) a brush card having brushes positioned for contact with said first and second plurality of commutator segments, a first set of brushes being arranged in a circular array and being circumferentially spaced from each other, and a second set of brushes being positioned radially outwardly thereof, said first set of brushes being wired to accommodate a first speed of the motor when said first set of brushes engages said first plurality of commutator segments and said second set of brushes being wired to accommodate the second speed of the motor when said second set of brushes engages said second plurality of commutator segments.

18. The two speed electric motor according to claim 17, wherein said first set of brushes includes two brushes and said second set of brushes includes two brushes.

19. The two speed electric motor according to claim 17, wherein said first set of brushes includes four brushes and said second set of brushes includes four brushes.

20. The two speed electric motor according to claim 17, wherein said first set of brushes includes more than one pair of brushes and said second set of brushes includes more than one pair of brushes.

21. A two speed electric motor comprises:
a) a housing;
b) a rotor positioned within said housing and including:
  1) a rotor shaft rotatably mounted within said housing;
  2) an armature core having armature windings wound therearound; and
c) a commutator for directing electric current from a plurality of electrically conductive brushes to the armature windings, said commutator including:
  1) a support member formed of electrically insulating material and adapted to be mounted on the rotor shaft, said support member having a surface portion for attachment of commutator segments;

2) a first plurality of circumferentially spaced, electrically conductive commutator segments attached to said surface portion of said support member and arranged in a generally circular array to be engaged by a first set of brushes of said plurality of brushes to accommodate a first speed of the motor;

3) at least a second plurality of circumferentially spaced, electrically conductive commutator segments attached to said surface portion of said support member and positioned radially outward of said first plurality of spaced commutator segments, said second plurality of commutator segments being arranged in a generally circular array to be engaged by a second set of brushes of said plurality of brushes to accommodate at least a second speed of the motor; and 4) a hook attached to each said first and second plurality of commutator segments to electrically connect said first and second plurality of commutator segments to armature windings of the motor.

22. The two speed electric motor according to claim 21, wherein there are ten commutator segments in said first plurality of segments and there are twenty commutator segments in said second plurality of commutator segments.

23. A two speed electric motor which comprises a) a housing;

b) a rotor positioned within said housing and including:

1) a rotor shaft rotatably mounted within said housing;

2) an armature core having armature windings wound therearound; and c) a face commutator for directing electric current from a plurality of electrically conductive brushes to the armature windings, said commutator including;

1) a support member formed of electrically insulating material and being adapted to be mounted on the rotor shaft, said support member having a surface portion for attachment of commutator segments;

2) a first plurality of circumferentially spaced, electrically conductive commutator segments attached to said surface portion of said support member and arranged in a generally circular array to accommodate a first speed of the motor; and 3) a second plurality of circumferentially spaced, electrically conductive commutator segments attached to said surface portion of said support member and positioned radially outward of said first plurality of spaced commutator segments, said second plurality of segments being twice the number of said first plurality of segments and arranged in a generally circular array to accommodate a second speed of the motor; and d) a brush card having a plurality of brushes thereon and positioned for respective contact with said first and second plurality of commutator segments to electrically connect said first and second plurality of commutator segments to armature windings of the motor and positioned for respective contact with said first and second plurality of commutator segments.

24. The two speed electric motor according to claim 23, wherein there are ten commutator segments in said first plurality of segments and there are twenty commutator segments in said second plurality of commutator segments.

25. The two speed motor according to claim 23, wherein said commutator segments comprise hooks extending from one side of said support member through apertures in said support member to the opposite side thereof.

* * * * *